United States Patent
Koguchi et al.

(10) Patent No.: US 7,249,226 B2
(45) Date of Patent: Jul. 24, 2007

(54) SEMICONDUCTOR SYSTEM AND MEMORY SHARING METHOD

(75) Inventors: Hiroshi Koguchi, Kanagawa (JP); Yusuke Ishizawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 219 days.

(21) Appl. No.: 10/931,216

(22) Filed: Sep. 1, 2004

(65) Prior Publication Data

US 2005/0102485 A1    May 12, 2005

(30) Foreign Application Priority Data

Sep. 2, 2003  (JP) .............................. 2003-309866

(51) Int. Cl.
*G06F 12/00* (2006.01)
*G06F 13/00* (2006.01)
*G06F 13/28* (2006.01)

(52) U.S. Cl. ..................... 711/147; 711/202; 711/220

(58) Field of Classification Search ................ 711/220, 711/147, 202, 203
See application file for complete search history.

(56) References Cited

U.S. PATENT DOCUMENTS

| | | | |
|---|---|---|---|
| 5,214,775 A | * | 5/1993 | Yabushita et al. .......... 711/117 |
| 5,347,428 A | * | 9/1994 | Carson et al. .............. 361/760 |
| 5,893,162 A | | 4/1999 | Lau et al. |
| 6,049,854 A | * | 4/2000 | Bedarida ..................... 711/153 |
| 6,161,168 A | | 12/2000 | Kametani |
| 6,795,907 B2 | * | 9/2004 | Wilson et al. .............. 711/206 |
| 2002/0078308 A1 | * | 6/2002 | Altman et al. .............. 711/147 |
| 2004/0250042 A1 | * | 12/2004 | Mehta et al. ............... 711/206 |

FOREIGN PATENT DOCUMENTS

JP    2000-172555 A    6/2000

* cited by examiner

*Primary Examiner*—Pierre Bataille
*Assistant Examiner*—Edward J Dudek
(74) *Attorney, Agent, or Firm*—Foley & Lardner LLP

(57) ABSTRACT

A semiconductor system according to an embodiment of the present invention comprises a shared memory; a plurality of processing units each of which designates a memory size and a memory address, and which uses the shared memory; an address allocation unit which allocates memory addresses having the memory size designated by the each processing unit to the processing unit; and an address conversion unit which converts the memory address designated by the each processing unit into one of the memory addresses allocated to the processing unit, the converted memory address being including in the shared memory and being accessed by the processing unit.

7 Claims, 10 Drawing Sheets

US 7,249,226 B2

SEMICONDUCTOR SYSTEM AND MEMORY SHARING METHOD

CROSS-REFERENCE TO RELATED APPLICATIONS

This application claims the benefit of priority under 35USC §119 to Japanese Patent Application No. 2003-309866 filed on Sep. 2, 2003, the entire contents of which are incorporated herein by reference.

BACKGROUND OF THE INVENTION

1. Field of the Invention

The present invention relates to a semiconductor system and a memory sharing method.

2. Background Art

Conventionally, a plurality of intellectual property ("IP") circuits within a single chip individually include therein memories.

These IP circuits do not, however, always operate simultaneously. If the IP circuits do not operate simultaneously, unused memories are present. Thus, it is disadvantageously impossible to make effective use of the memories. Also in this way, in the case that each IP circuit has memories, there is also a problem that circuit area increases.

SUMMARY OF THE INVENTION

A semiconductor system according to an embodiment of the present invention comprises a shared memory; a plurality of processing units each of which designates a memory size and a memory address, and which uses the shared memory; an address allocation unit which allocates memory addresses having the memory size designated by the each processing unit to the processing unit; and an address conversion unit which converts the memory address designated by the each processing unit into one of the memory addresses allocated to the processing unit, the converted memory address being including in the shared memory and being accessed by the processing unit.

A semiconductor system according to an embodiment of the present invention comprises a shared memory including a plurality of sections, each section having a predetermined number of memory addresses; a plurality of processing units each of which designates a memory address, and which uses the shared memory; a section selection unit which selects at least one section from among the plurality of sections based on upper figure of the memory address designated by the each processing unit; and an address conversion unit which converts the memory address designated by the each processing unit into one of addresses included in the selected section, based on the selected section and lower figure of the memory address designated by the each processing unit, the converted memory address being accessed by the each processing unit.

A memory sharing method for sharing a memory formed on a same chip among a plurality of processing units formed on the chip, according to an embodiment of the present invention comprises; each of the plurality of processing units designates a memory size to a memory management unit that manages the memory and is formed on the chip; the memory management unit allocates memory addresses having the memory size by the each processing unit to the each processing unit; the each processing unit outputs a memory address as an access destination in the memory; the memory management unit converts the memory address outputted from the each processing unit into one of memory addresses allocated to the each processing unit; and the each processing unit accesses the converted memory address in the memory.

DETAILED DESCRIPTION OF THE INVENTION

FIRST EMBODIMENT

Figure 1:
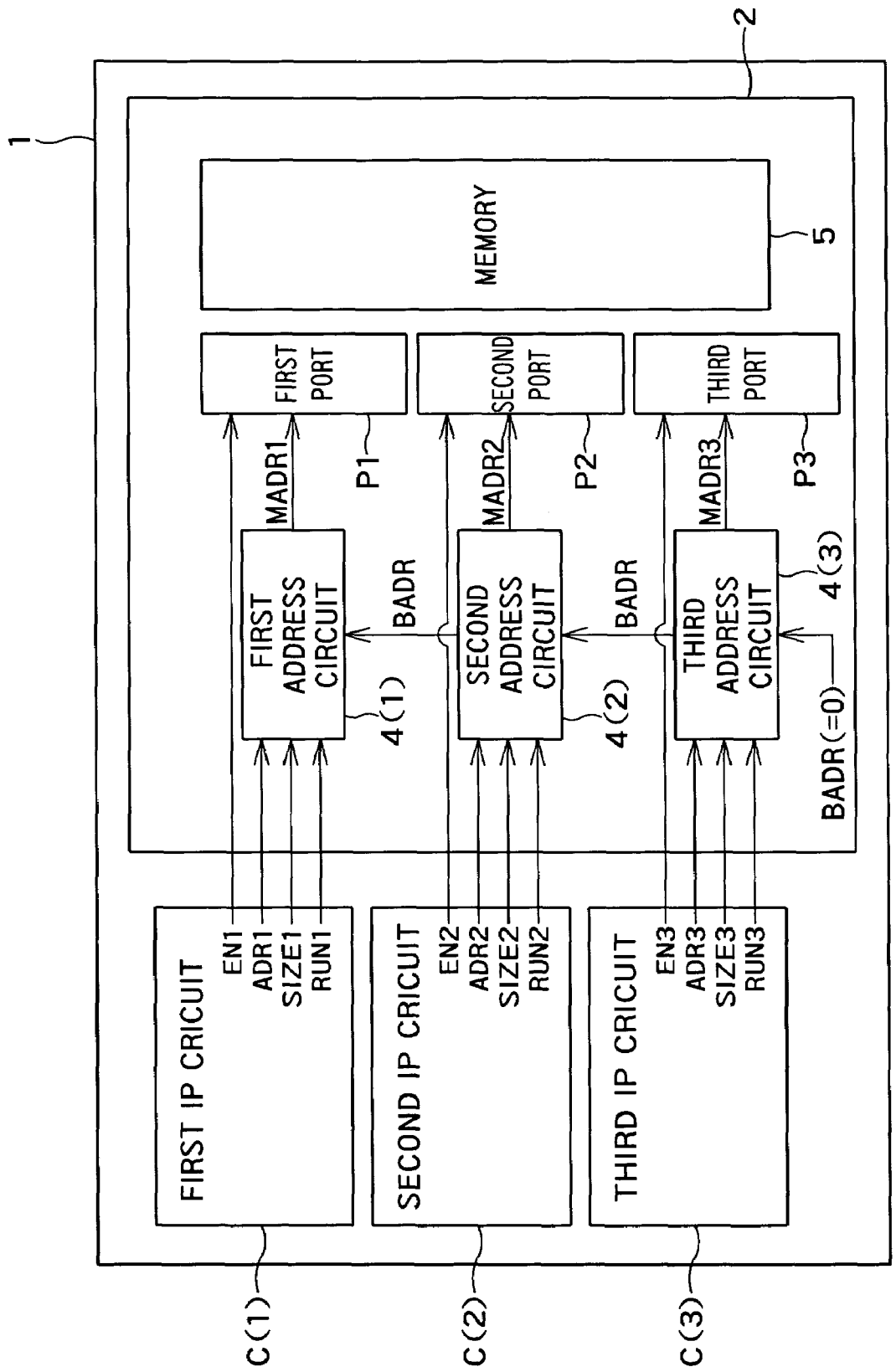
FIG. 1 is a block diagram which shows configuration of a semiconductor device in a semiconductor system according to a first embodiment of the present invention.

FIG. 1 is a block diagram which shows configuration of a semiconductor device 1 in a semiconductor system according to a first embodiment of the present invention.

The semiconductor device 1 is constituted by one chip. Namely, respective constituent elements of the semiconductor device 1 are formed on the same chip. The semiconductor device 1 is connected to a CPU bus (main bus), not shown.

The semiconductor device 1 includes a first IP circuit C(1), a second IP circuit C(2), and a third IP circuit C(3) which perform various processings according to respective purposes. The semiconductor device 1 also includes a shared memory control circuit 2 for realizing sharing of a memory 5 among the first IP circuit C(1) to the third IP circuit C(3).

The first IP circuit C(1) to the third IP circuit C(3) output enable signal EN1 to EN3 each indicating a data write or read timing, addresses ADR1 to ADR3 each indicating data write or read addresses in the memory 5, sizes SIZE1 to SIZE3 each representing a memory size necessary for each circuit during an operation, and run signal RUN1 to RUN3 each indicating whether each of the first IP circuit C(1) to the third IP circuit C(3) is in operation, i.e., active, respectively. The first IP circuit C(1) to the third IP circuit C(3) also output write control signal or read control signal, not shown, for instructing data writing or data reading, data to be written to the memory 5 in the case of writing, not shown, and the like, respectively.

It is assumed herein that a maximum of two of the first IP circuit C(1) to the third IP circuit C(3) operate simultaneously (two run signal RUN are asserted), and that the three IP circuits C(1) to C(3) do not operate simultaneously.

The shared memory 5 is shared among the first IP circuit C(1) to the third IP circuit C(3). The size of this memory 5 is a sum of a largest memory size and a second largest memory size among those necessary for the first IP circuit C(1) to the third IP circuit C(3). This is intended to satisfy the above-stated condition that a maximum of two IP circuits among the three IP circuits C(1) to C(3) operate simultaneously.

A first port P1 to a third port P3 are ports through which the first IP circuit C(1) to the third IP circuit C(3) exchange data with the memory 5, respectively.

More specifically, each of the first port P1 to the third port P3 includes a data write port and a data read port. Each of the first port P1 to the third port P3 also includes an port for inputting corresponding one of the enable data EN1 to EN3, a address port for inputting corresponding one of the memory addresses MADR1 to MADR3, to be described later, a port for inputting the above-stated write control signal and read control signal, and the like.

A first address circuit 4(1) to a third address circuit 4(3) allocate addresses in the shared memory 5 to the first IP circuit C(1) to the third IP circuit C(3), and convert the addresses ADR1 to ADR3 outputted from the first IP circuit C(1) to the third IP circuit C(3) into the memory addresses MADR1 to MADR3 included in the allocated addresses, respectively.

Figure 2:
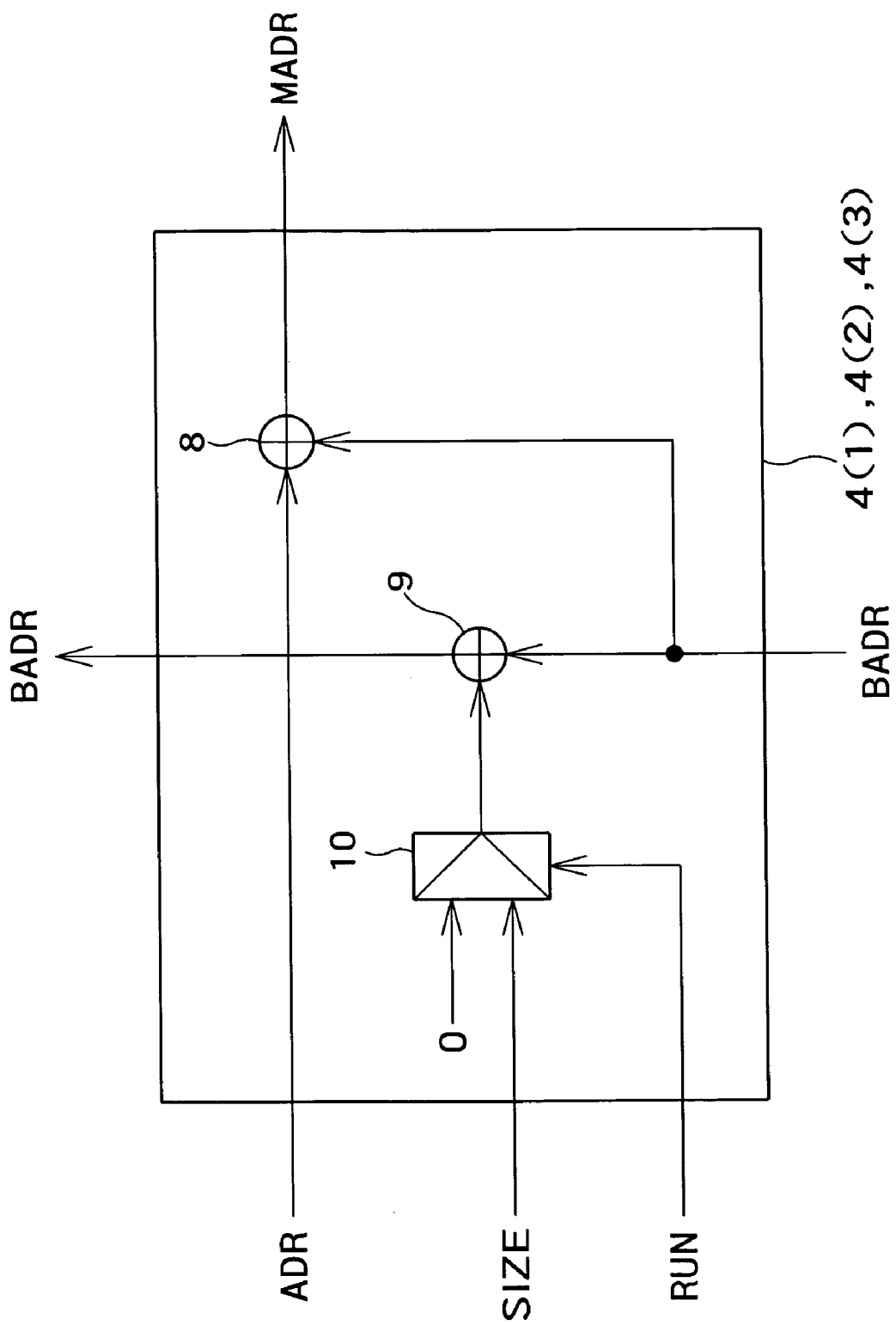
FIG. 2 is a block diagram which shows configuration of an $n^{th}$ address circuit.

FIG. 2 is a block diagram which shows configuration of one of the first address circuit 4(1) to the third address circuit 4(3) (configuration of an $n^{th}$ address circuit 4($n$)).

As shown in FIG. 2, the $n^{th}$ address circuit 4($n$) includes two adders 8 and 9, and one selector 10.

The adder 8 adds up a base address BADR and the address ADR (one of the addresses ADR1 to ADR3 in FIG. 1) from the corresponding IP circuit, and generates the memory address MADR (one of the memory addresses MADR1 to MADR3 in FIG. 1).

The selector 10 outputs the size SIZE (one of the sizes SIZE1 to SIZE3 in FIG. 1) from the IP circuit as it is if a run signal RUN is asserted, and outputs data 0 if the run signal RUN is de-asserted. That run signal RUN is asserted corresponds to a memory allocation signal being inputted to the address circuit.

The adder 9 adds up the base address BADR and the output data (the size SIZE or the data 0) outputted from the selector 10, and outputs the addition result as the base address BADR to a higher-order circuit (the second address circuit 4(2) if the address circuit is the third address circuit 4(3), or the first address circuit 4(1) if the address circuit is the second address circuit 4(2)).

As can be understood from the above, the adder 9 functions to allocate addresses to the corresponding IP circuit by as much as the size SIZE. The adder 8 functions to convert the address ADR outputted from the corresponding IP circuit into the memory address MADR included in the address allocated by the adder 9.

Referring to FIGS. 1 and 2, operations of the semiconductor device 1 will be described below.

As shown in FIG. 1, if the third IP circuit C(3) asserts a run signal RUN3, then the third address circuit 4(3) adds up the base address BADR (address 0) allocated thereto in advance and the address ADR3 outputted from the third IP circuit C(3), and outputs the addition result as the memory address MADR3. The third port P3 receives this memory address MADR3 as well as the enable signal EN3, the write control signal or read control signal, not shown, and the write-in data (in the case of writing), not shown, from the third IP circuit C(3), and outputs the received signal/data to the memory 5. If data is to be written, the memory 5 stores the received write-in data in an area at the memory address MADR3 at an input timing of the enable signal EN3. If data is to be read, the memory 5 reads data from the area at the memory address MADR3, and transmits the read data to the third IP circuit C(3) through the third port P3. Further, the third address circuit 4(3) adds up the size SIZE3 from the third IP circuit C(3) and the base address BADR (assumed as address 0) allocated thereto, thereby calculates a base address BADR to be output to the second address circuit 4(2), and transmits the calculated base address BADR to the second address circuit 4(2).

On the other hand, if the third IP circuit C(3) de-asserts the run signal RUN3, the third address circuit 4(3) adds up the data 0 selected by the selector 10 (see FIG. 2) and the base address BADR (address 0), and transmits the addition result to the second address circuit 4(2) as the base address BADR.

If the second IP circuit C(2) asserts a run signal RUN2, then the second address circuit 4(2) adds up the base address BADR inputted from the third address circuit 4(3) and the address ADR2 outputted from the second IP circuit C(2), and outputs the addition result as the memory address MADR2. The second port P2 receives this memory address MADR2 as well as the enable signal EN2, the write control signal or read control signal, not shown, and the write-in data (if data is to be written), not shown, from the second IP circuit C(2), and outputs the received signal/data to the memory 5. If data is to be written, the memory 5 stores the received write-in data in an area at the memory address MADR2. If data is to be read, the memory 5 reads data from the area at the memory address MADR2 and transmits the read data to the second IP circuit C(2) through the second port P2. The second address circuit 4(2) adds up the base address BADR inputted from the third address circuit 4(3) and the size SIZE2 outputted from the second IP circuit C(2), thereby calculates the base address BADR to be outputted to the first address circuit 4(1), and transmits the calculated base address BADR to the first address circuit 4(1).

On the other hand, if the second IP circuit C(2) de-asserts the run signal RUN2, the second address circuit 4(2) adds up the data 0 selected by the selector 10 (see FIG. 2) and the base address BADR inputted from the third address circuit 4(3), and transmits the addition result to the first address circuit 4(1) as the base address BADR.

If the first IP circuit C(1) asserts a run signal RUN1, then the first address circuit 4(1) adds up the base address BADR inputted from the second address circuit 4(2) and the address ADR1 outputted from the first IP circuit C(1), and outputs the addition result as the memory address MADR1. The first port P1 receives this memory address MADR1 as well as the enable signal EN1, the write control signal or read control signal, not shown, and the write-in data (if data is to be written), not shown, from the first IP circuit C(1), and outputs the received signal/data to the memory 5. If data is to be written, the memory 5 stores the received write-in data in an area at the memory address MADR1. If data is to be read, the memory 5 reads out data from the area at the memory address MADR1 and transmits the read data to the first IP circuit C(1) through the first port P1.

The operations of the semiconductor device 1 will be described more specifically below.

Figure 3:
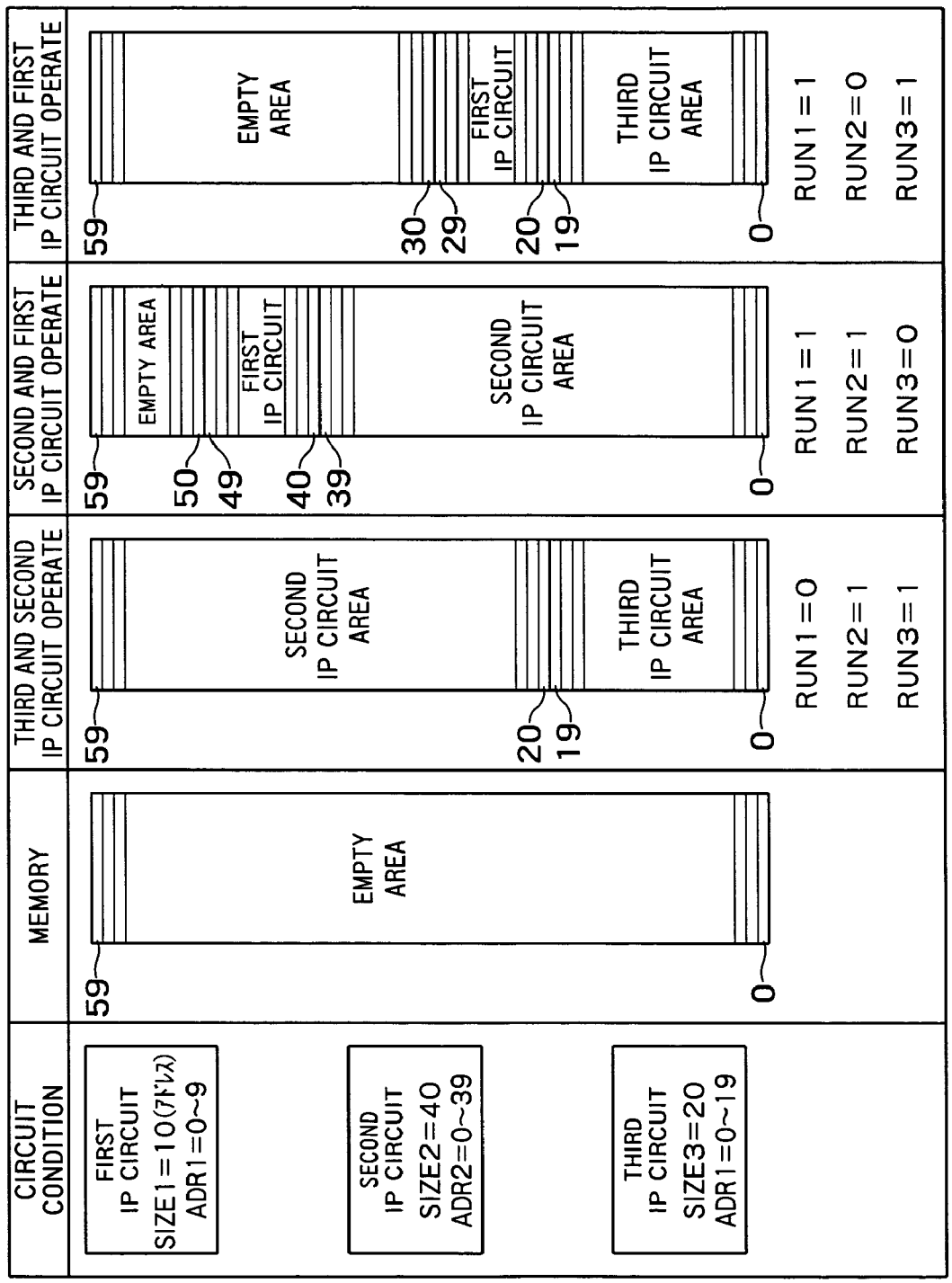
FIG. 3 is an explanatory view for describing the operations of the semiconductor device.

FIG. 3 is an explanatory view for describing the operations of the semiconductor device more specifically.

Referring to FIG. 3, preconditions will first be described before describing the operations of the semiconductor device.

As indicated in a "CIRCUIT CONDITION" column in FIG. 3, it is assumed herein as follows. The first IP circuit C(1) outputs 10 (addresses) as the size SIZE1 and outputs addresses 0 to 9 as the address ADR1.

The second IP circuit C(2) outputs 40 (addresses) as the size SIZE2 and outputs addresses 0 to 39 (addresses) as the address ADR2.

The third IP circuit C(3) outputs 20 (addresses) as the size SIZE3 and outputs addresses 0 to 19 (addresses) as the address ADR3.

As can be understood from the above, the sizes SIZE1 to SIZE3 are 10, 40, and 20, respectively. Therefore, a minimum memory size necessary to the memory 5 is a sum of the largest memory size and the second largest memory size, that is, 40+20=60 (addresses). Thus, for example, as indicated in a "MEMORY" column in FIG. 3, a memory having an address 0 to an address 59 (60 addresses) is prepared as the memory 5.

Under these preconditions, the operations of the semiconductor device 1 will be described, taking a case of writing-in data as an example.

As indicated in a "THIRD AND SECOND IP CIRCUITS OPERATE" column in FIG. 3, an example in which the third IP circuit C(3) and the second IP circuit C(2) operate will be described.

First, while asserting the run signal RUN3, the third IP circuit C(3) outputs the address ADR3 (one of addresses 0 to 19) and the size SIZE3 (=20) to the third address circuit 4(3). In addition, the base address BADR (=0) is input to the third address circuit 4(3). The third address circuit 4(3) adds up the address ADR3 (one of addresses 0 to 19) and the base address BADR (=0), and outputs the addition result as the memory address MADR3 (one of addresses 0 to 19). The write-in data, not shown, from the third IP circuit C(3) is written to the area at this memory address MADR3 (one of addresses 0 to 19) as shown in FIG. 3.

On the other hand, as shown in FIG. 1, the third address circuit 4(3) adds up the size SIZE3 (=20) received from the third IP circuit C(3) and the base address BADR (=0), and transmits the addition result as the base address BADR (=20) to the second address circuit 4(2).

While asserting the run signal RUN2, the second IP circuit C(2) outputs the address ADR2 (one of addresses 0 to 39) and the size SIZE2 (=40) to the second address circuit 4(2). The second address circuit 4(2) adds up the address ADR2 (one of addresses 0 to 39) and the base address BADR (=20) received from the third address circuit 4(3), and outputs the addition result as the memory address MADR2 (one of addresses 20 to 59). The write-in data, not shown, from the second IP circuit C(2) is written to the area at this memory address MADR2 (one of addresses 20 to 59) as shown in FIG. 3.

On the other hand, the second address circuit 4(2) adds up the size SIZE2 (=40) received from the second IP circuit C(2) and the base address BADR (=20) received from the third address circuit 4(3), and outputs the addition result to the first address circuit 4(1) as the base address BADR (=60).

Next, as indicated in a "SECOND AND FIRST IP CIRCUITS OPERATE" column shown in FIG. 3, an example in which the second IP circuit C(2) and the first IP circuit C(1) operate will be described.

As shown in FIG. 1, while the third IP circuit C(3) de-asserts the run signal RUN3, the base address BADR (=0) is input to the third address circuit 4(3). The third address circuit 4(3) adds up this base address BADR (=0) and the data 0 (see FIG. 2), and transmits the addition result to the second address circuit 4(2) as the base address BADR.

The second address circuit 4(2) adds up the base address (=0) received from the third address circuit 4(3) and the address ADR2 (one of addresses 0 to 39) received from the second IP circuit C(2), and outputs the addition result as the memory address MADR2 (one of addresses 0 to 39). The write-in data outputted from the second IP circuit C(2) is written to the area at one of addresses 0 to 39 in the memory 5 as shown in FIG. 3.

On the other hand, the second address circuit 4(2) adds up the size SIZE2 (=40) received from the second IP circuit C(2) and the base address BADR (=0) received from the third address circuit 4(3), and transmits the addition result to the first address circuit 4(1) as the base address BADR (=40).

While asserting the run signal RUN1, the first IP circuit C(1) outputs the address ADR1 (one of addresses 0 to 9) and the size SIZE1 (=10) to the first address circuit 4(1). The first address circuit 4(1) adds up the address ADR1 (one of addresses 0 to 9) and the base address BADR (=40) received from the second address circuit 4(2), and outputs the addition result as the memory address MADR (one of addresses 40 to 49). The write-in data outputted from the first IP circuit C(1) is written to the area at one of the addresses 40 to 49 in the memory 5 as shown in FIG. 3. Remaining addresses 50 to 59 serve as a empty area.

As indicated in a "THIRD AND FIRST IP CIRCUITS OPERATE" column shown in FIG. 3, an example in which the third IP circuit C(3) and the first IP circuit C(1) operate will be described below.

As shown in FIG. 1, while asserting the run signal RUN3, the third IP circuit C(3) outputs the address ADR3 (one of addresses 0 to 19) and the size SIZE3 (=20) to the third address circuit 4(3). In addition, the base address BADR (=0) is input to the third address circuit 4(3). The third address circuit 4(3) adds up the address ADR3 (one of addresses 0 to 19) and the base address BADR (=0), and outputs the addition result as the memory address MADR3 (one of addresses 0 to 19). The write-in data outputted from the third IP circuit C(3) is written to an area at one of the addresses 0 to 19 in the memory 5 as shown in FIG. 3.

On the other hand, the third address circuit 4(3) adds up the size SIZE3 (=20) received from the third IP circuit C(3) and the base address BADR (=0), and transmits the addition result to the second address circuit 4(2) as the base address BADR (=20).

While the second IP circuit C(2) de-asserts the run signal RUN2, the third address circuit 4(3) outputs the base address BADR (=20) to the second address circuit 4(2). The second address circuit 4(2) adds up this base address BADR (=20) and the data 0 (see FIG. 2), and transmits the addition result to the first address circuit 4(1) as the base address BADR.

While asserting the run signal RUN1, the first IP circuit C(1) outputs the address ADR1 (one of addresses 0 to 9) and the size SIZE1 (=10) to the first address circuit 4(1). The first address circuit 4(1) adds up the address ADR1 (one of addresses 0 to 9) and the base address BADR (=20) received from the second address circuit 4(2), and outputs the addition result as the memory address MADR1 (one of addresses 20 to 29). The write-in data outputted from the first IP circuit C(1) is written to the area at one of the addresses 20 to 29 in the memory 5, as shown in FIG. 3. Remaining addresses 30 to 59 serve as a empty area.

In this embodiment and other embodiments described later, the term semiconductor system includes both a device constituted by a single chip, and a device constituted by a plurality of chips.

In this embodiment, a plurality of IP circuits and one memory are provided on the same chip. Alternatively, a plurality of chips and one memory can be connected to a bus other than the CPU bus, and the memory can be shared among the chips.

As described above, according to the first embodiment of the present invention, the memory addresses in the shared memory are allocated to the IP circuit which is activated (which transmits a memory allocation request) by as much as a necessary size. Therefore, it is possible to make effective use of the memory. In addition, the memory addresses outputted from the IP circuit as the access destination are converted into another memory addresses included in the allocated memory addresses. Therefore, each IP address circuit can access the shared memory with the addresses viewed from the IP circuit remaining unchanged. Further, according to the first embodiment, the maximum number of IP circuits that operate simultaneously are specified in a descending order of used memory sizes, and it suffices that at least the sum of the memory sizes used by these IP circuits are secured in the shared memory. It is, therefore, possible to reduce the number of gates (of transistors) and an area of the chip. Besides, according to the first embodiment, the respective IP circuits share the memory on the same chip. Therefore, it is unnecessary to acquire the right of using the bus for memory access and each IP circuit can use the memory at an appropriate time.

SECOND EMBODIMENT

Figure 4:
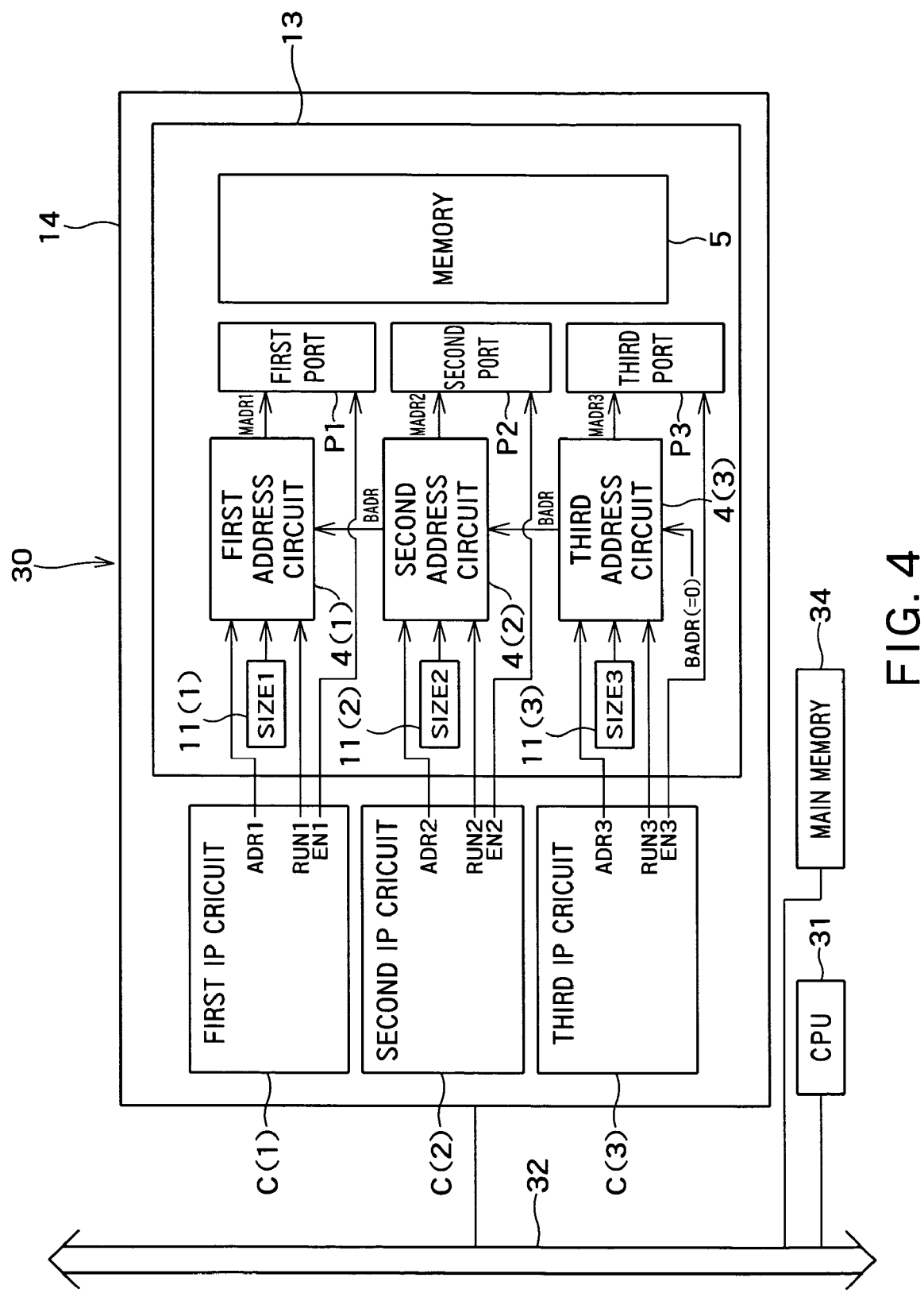
FIG. 4 is a block diagram which shows a semiconductor device in a semiconductor system according to a second embodiment of the present invention.

FIG. 4 is a block diagram which shows a semiconductor device 12 in a semiconductor system 30 according to a second embodiment of the present invention. The semiconductor device 12 is connected to a CPU 31 and a main memory 34 through a CPU bus 32.

The semiconductor device 12 differs from the semiconductor device 1 according to the first embodiment in the following respects.

According to the first embodiment, the sizes SIZE1 to SIZE3 that represent the memory sizes necessary to the respective IP circuits C(1) to C(3) are outputted from the first to the third IP circuits C(1) to C(3) to the first to the third address circuits 4(1) to 4(3), respectively. According to the second embodiment, these sizes SIZE1 to SIZE3 are stored in registers 11(1) to 11(3), and the first to the third address circuits 4(1) to 4(3) acquire the sizes SIZE1 to SIZE3 from the registers 11(1) to 11(3), respectively. Values of the registers 11(1) to 11(3) can be changed by, for example, allowing the CPU 31 to execute software stored in the main memory 34.

As described above, according to the second embodiment, the sizes SIZE1 to SIZE3 that represent the memory sizes used by the respective IP circuits are stored in the registers. Therefore, by changing the sizes SIZE1 to SIZE3, it is possible to easily deal with a change of the memory size necessary for each IP circuit.

THIRD EMBODIMENT

Figure 5:
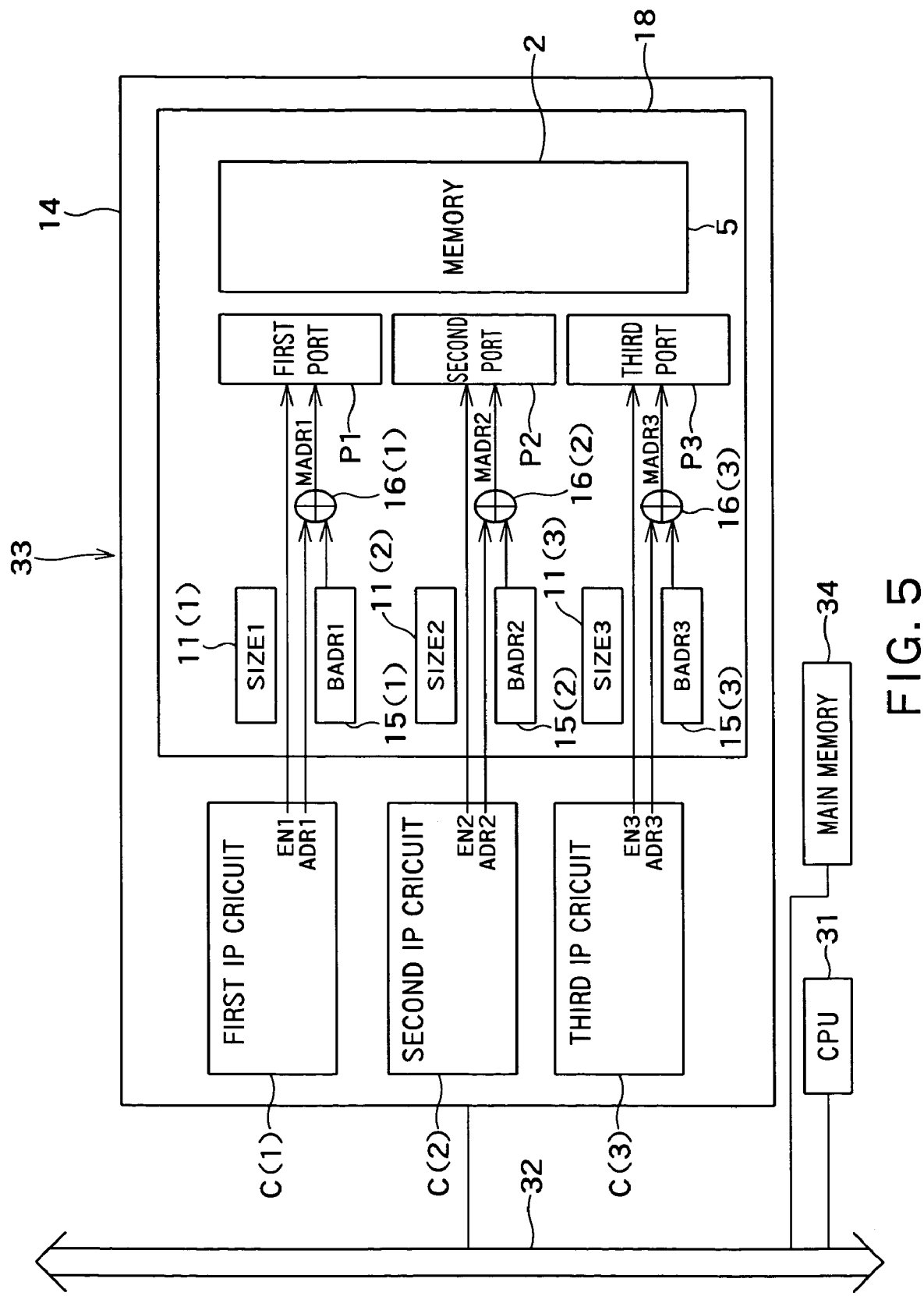
FIG. 5 is a block diagram which shows a semiconductor device in a semiconductor system according to a third embodiment of the present invention.

FIG. 5 is a block diagram which shows a semiconductor device 14 in a semiconductor system 33 according to a third embodiment of the present invention. The semiconductor device 14 is connected to a CPU 31 and a main memory 34 through a CPU bus 32.

As shown in FIG. 5, according to the third embodiment, registers 15(1) to 15(3) which store base addresses BADR1 to BADR3 are provided to correspond to a first IP circuit C(1) to a third IP circuit C(3), respectively. In addition, similarly to the second embodiment, registers 11(1) to 11(3) which store sizes SIZE1 to SIZE3 are provided to correspond to the first to the third IP circuits C(1) to C(3), respectively.

The base addresses BADR1 to BADR3 stored in the registers 15(1) to 15(3) and the sizes SIZE1 to SIZE3 stored in the registers 11(1) to 11(3) can be changed by, for example, allowing the CPU 31 to execute a program stored in the main memory 34.

Further, according to the third embodiment, adders 16(1) to 16(3) are provided in place of the first address circuit 4(1) to the third address circuit 4(3) employed in the first and the second embodiments, respectively. The adders 16(1) to 16(3) add up the base addresses BADR1 to BADR3 inputted from the registers 15(1) to 15(3) and addresses ADR1 to ADR3 outputted from the first IP circuit C(1) to the third IP circuit C(3), and generate memory addresses MADR1 to MADR3, respectively.

Referring to FIG. 5 and FIGS. 6A to 6C, operations of the semiconductor device 14 will be described, taking a case of writing data as an example.

It is assumed herein that the first IP circuit C(1) and the third IP circuit C(3) operate among the first IP circuit C(1) to the third IP circuit C(3), and that the first IP circuit C(1) starts operating prior to the third IP circuit C(3).

It is also assumed herein that the sizes SIZE1 to SIZE3 are 10, 40, and 20, respectively, similarly to the first embodiment (see FIG. 3). It is further assumed herein that the address ADR1 corresponds to addresses 0 to 9, the address ADR2 corresponds to addresses 0 to 39, and the address ADR3 corresponds to addresses 0 to 19 (see FIG. 3). In addition, it is assumed herein that a memory 5 has addresses 0 to 59 (see FIG. 3).

Figure 6C:
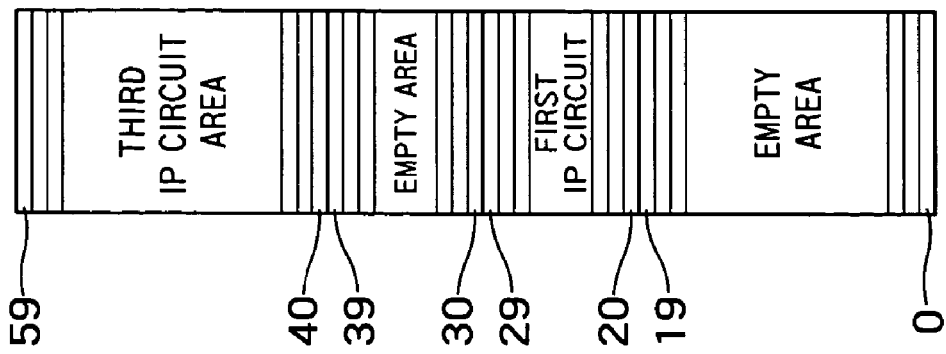
FIGS. 6A to 6C show data states within the memory at time series.
Figure 6B:
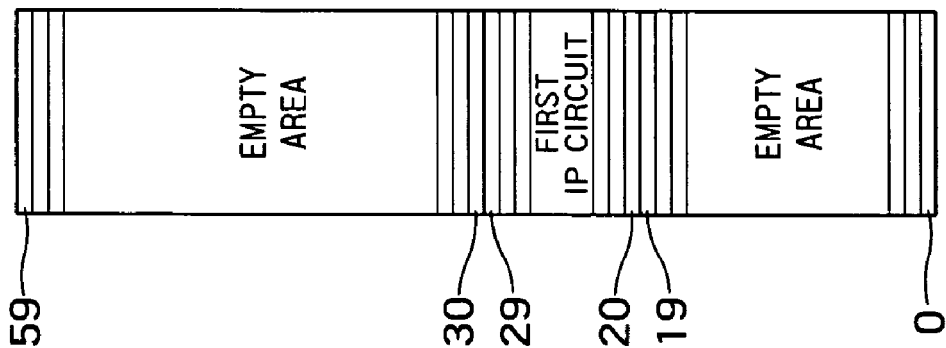
Figure 6A:
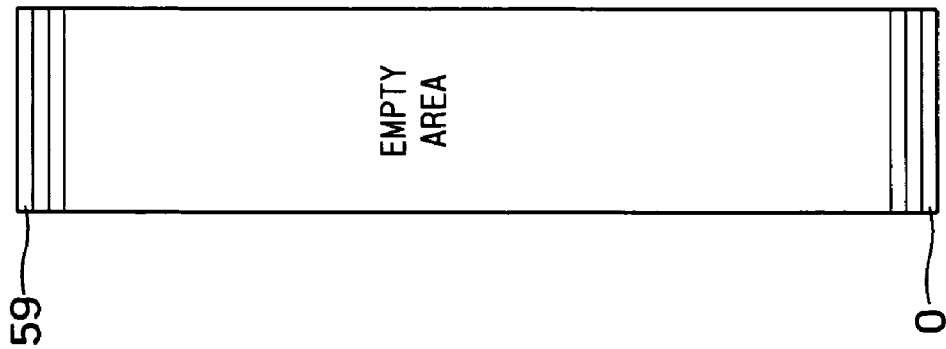

FIGS. 6A to 6C show data states within the memory 5 at time series.

As shown in FIG. 6A, no data is initially stored in the memory 5.

In this state, when the first IP circuit C(1) starts operating, a shared memory control circuit 18 calculates the base address BADR1 (here assumed as address 20) which can secure a continuous area of the size SIZE1 (=10) in the memory 5, and sets the calculated base address BADR1 to the register 15(1). Alternatively, before the first IP circuit C(1) starts operating, the CPU 31 may set the base address BADR1 to the register 15(1) according to software stored in the main memory 34.

The adder 16(1) receives the address ADR1 (one of addresses 0 to 9) outputted from the first IP circuit C(1), acquires the base address BADR1 (address 20) from the register 15(1), adds up the address ADR1 and the base address BADR1, and outputs the addition result as the memory address MADR1 (one of addresses 20 to 29). The memory 5 receives the memory address MADR1 through the first port P1, and writes the write-in data, not shown, from the first IP circuit C(1) to an area at the memory address MADR1 (one of addresses 20 to 29) as shown in FIG. 6B.

It is assumed that the third IP circuit C(3) starts operating in this state. The shared memory control circuit 18 calculates the base address BADR3 (here assumed as address 40) which can secure a continuous area of the size SIZE3 (=20) in areas other than the area (at the addresses 20 to 29) which is already allocated in the memory 5, and sets the calculated base address BADR3 to the register 15(3). Alternatively, before the third IP circuit C(3) starts operating, the CPU 31 may set the base address BADR3 to the register 15(3) according to the software stored in the main memory 34.

The adder 16(3) adds up the address ADR3 (one of addresses 0 to 19) outputted from the third IP circuit C(3) and the base address BADR3 (address 40) from the register 15(3), and outputs the addition result as the memory address MADR3 (one of addresses 40 to 59). The memory 5 receives this memory address MADR3 through a third port P3, and writes the write-in data from the third IP circuit C(3) to an area at the memory address MADR3 (one of addresses 40 to 59) as shown in FIG. 6C.

As described above, according to the third embodiment, the base addresses BADR1 to BADR3 for the first IP circuit C(1) to the third IP circuit C(3) can be freely set. Therefore, arbitrary addresses can be allocated to the respective IP circuits.

FOURTH EMBODIMENT

Figure 7:
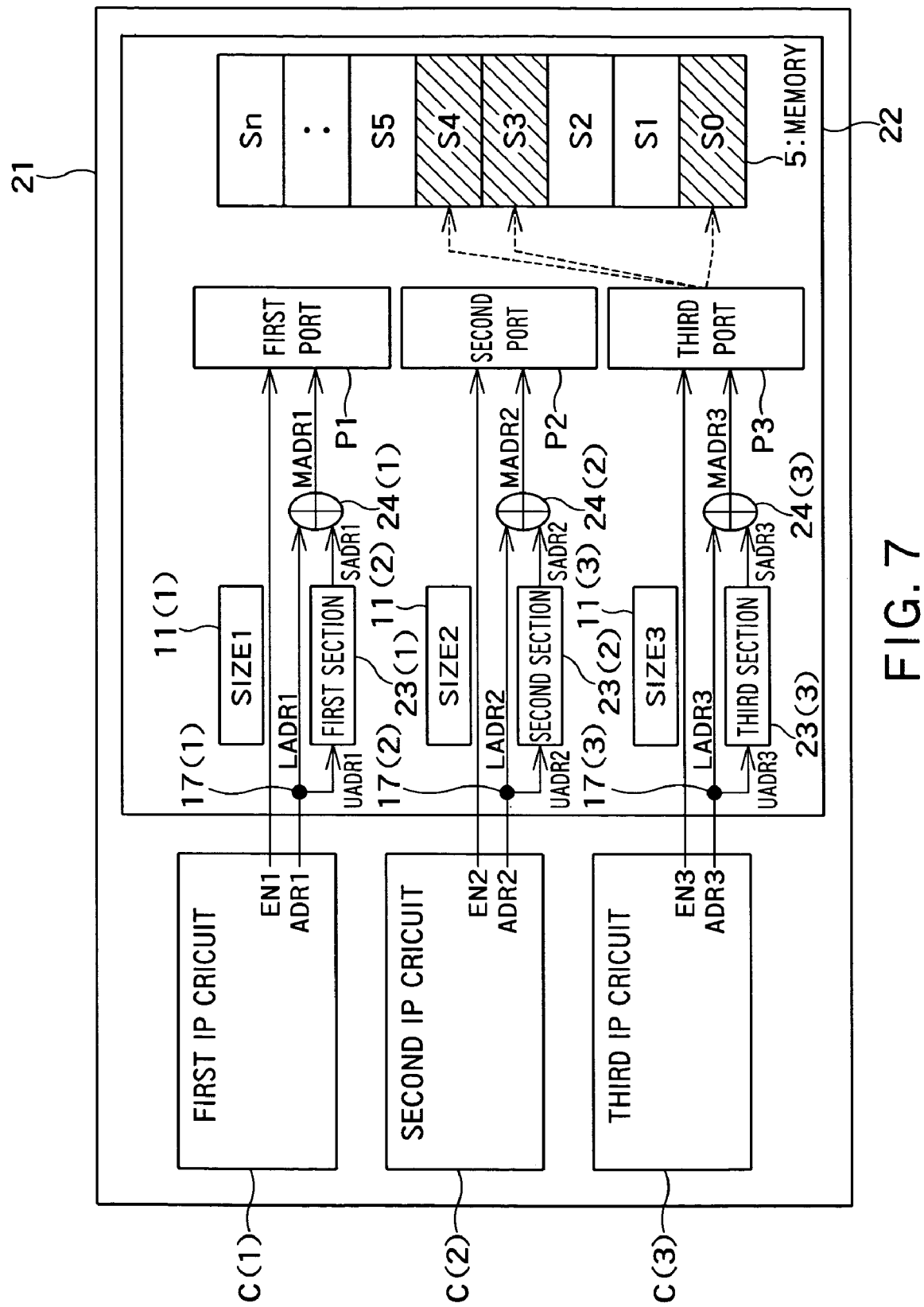
FIG. 7 is a block diagram which shows a semiconductor device in a semiconductor system according to a fourth embodiment of the present invention.

FIG. 7 is a block diagram which shows a semiconductor device 21 in a semiconductor system according to a fourth embodiment of the present invention. As shown in FIG. 7, a memory 5 in this embodiment is divided into sections S1 to Sn equal in size (e.g., ten addresses).

Division circuits 17(1) to 17(3) divide addresses ADR1 to ADR3 outputted from a first IP circuit C(1) to a third IP circuit C(3) into upper addresses UADR1 to UADR3 and lower addresses LADR1 to LADR3, respectively.

A first section determination unit 23(1) to a third section determination unit 23(3) obtain the corresponding sections S1 to Sn as section addresses SADR1 to SADR3 based on the upper addresses UADR1 to UADR3, respectively.

Concatenate circuits 24(1) to 24(3) concatenate the obtained section addresses SADR1 to SADR3 with the lower addresses LADR1 to LADR3, and output concatenation results as memory addresses MADR1 to MADR3, respectively.

Figure 9:
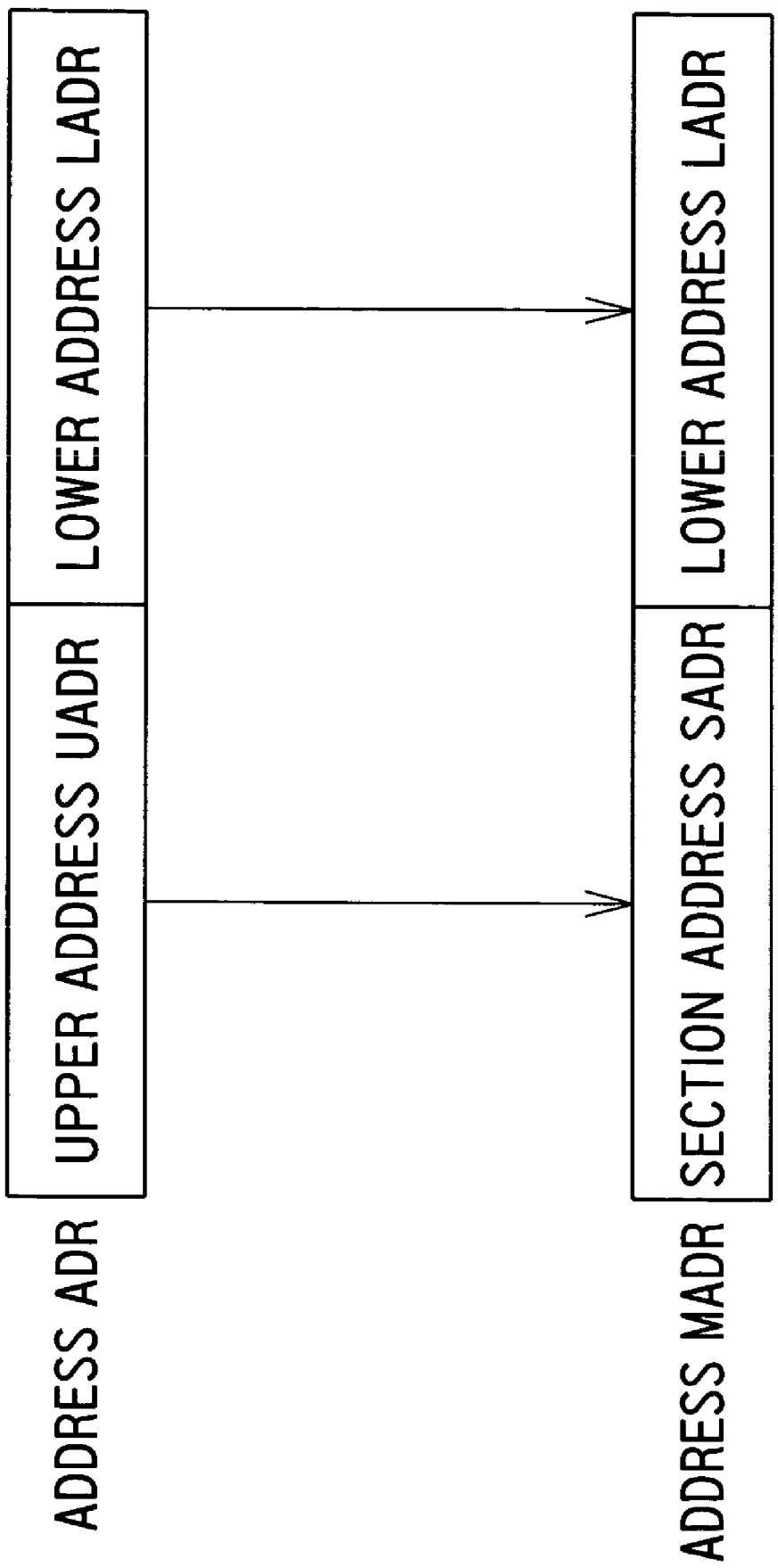
FIG. 9 shows the relationship between a address ADR and a memory address MADR.

FIG. 9 shows the relationship between the address ADR (which generically represents each of the addresses ADR1 to ADR3) and the memory address MADR (which generically represents each of the memory addresses MADR1 to MADR3; the same shall apply hereafter).

The upper address UADR in the address ADR is converted into the section address SADR by the section determination unit. The section address SADR is concatenated with the lower address LADR to generate the memory address MADR by the concatenate circuit. For example, if the address ADR is "58", and the upper address "5" in the address ADR is converted into the section address SADR "1", the memory address MADR is "18" obtained by concatenating the section address SADR "1" with the lower address LADR "8".

Figure 8:
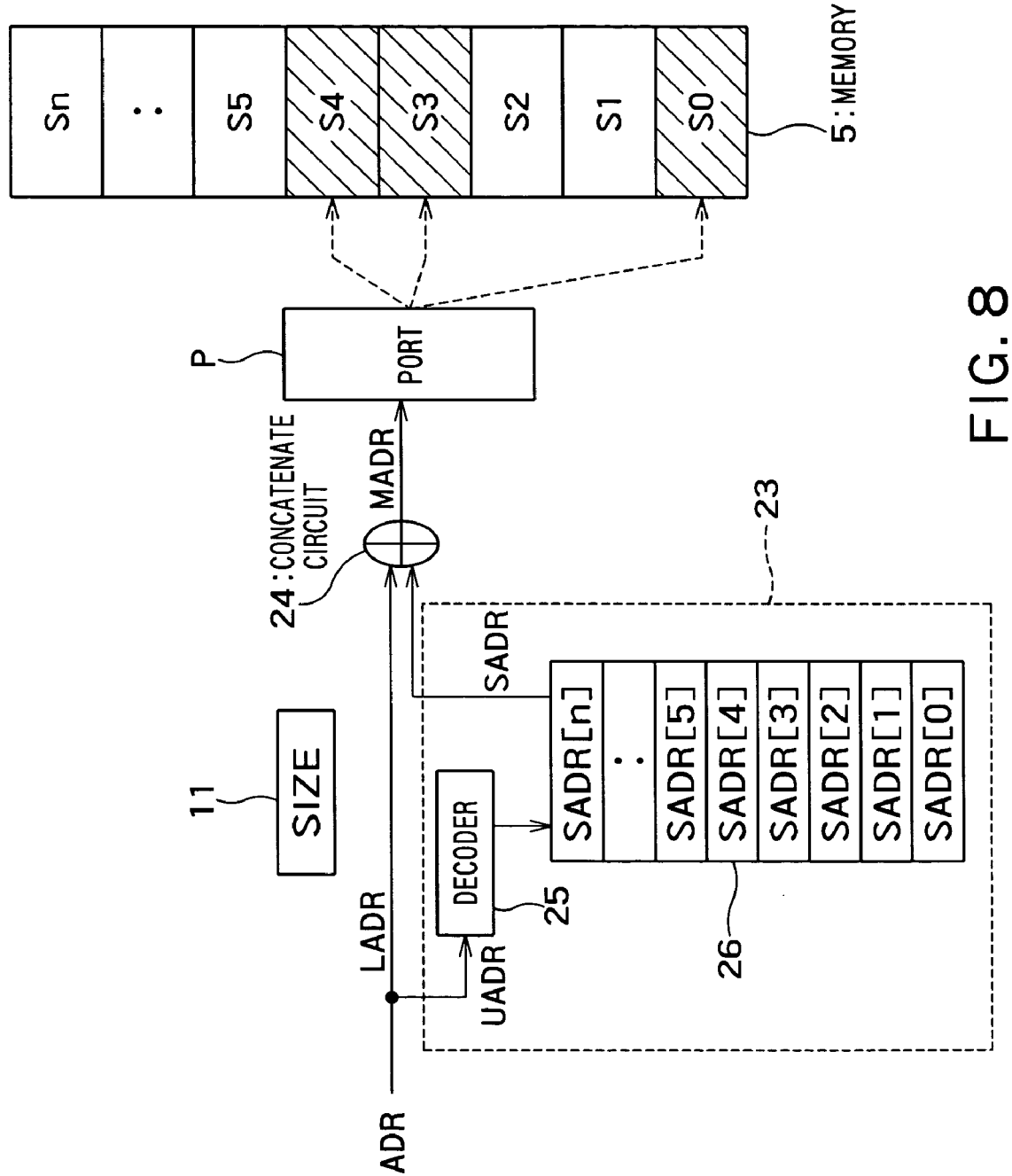
FIG. 8 shows configuration of a section determination.

FIG. 8 shows configuration of the first section determination unit 23(1) to the third section determination unit 23(3).

A storage unit 26 stores section addresses SADR[0] to SADR[n] corresponding to the respective sections S1 to Sn.

A decoder 25 selects a corresponding section address (or corresponding section addresses) from among the section addresses SADR[0] to SADR[n] based on the upper address UADR. The decoder 25 is constituted to be able to recognize use state of sections in each IP circuit C(1)-C(3).

Referring to FIGS. 7, 8, and 10A to 10C, operations of the semiconductor device 21 according to the fourth embodiment will below be described, taking a case of writing data as an example.

It is assumed herein that the first IP circuit C(1) and the second IP circuit C(2) operate among the first IP circuit C(1) to the third IP circuit C(3). It is also assumed herein that the sizes SIZE1 to SIZE3 are 10, 40, and 20, respectively, similarly to the first embodiment (see FIG. 3). It is further assumed herein that the address ADR1 corresponds to addresses 0 to 9, the address ADR2 corresponds to addresses 0 to 39, and the address ADR3 corresponds to addresses 0 to 19 (see FIG. 3). In addition, it is assumed herein that the memory 5 has addresses 0 to 59 (see FIG. 3), and that the memory 5 is divided into, for example, six sections S0 to S5 (each section having a size of ten addresses) (n=5 in FIGS. 7 and 8).

Figure 10C:
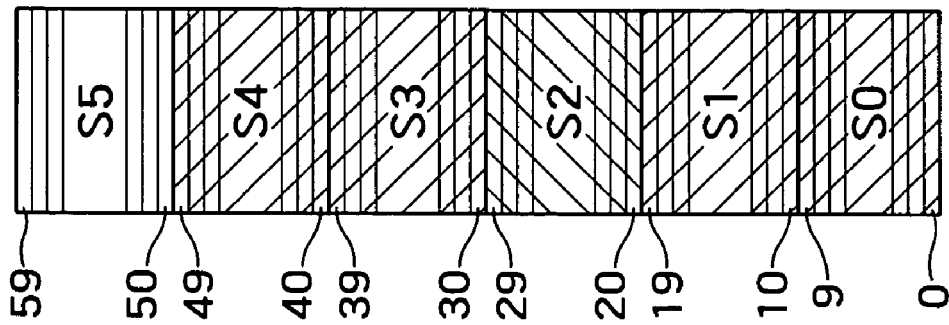
FIGS. 10A to 10C show data states within the memory at time series.
Figure 10B:
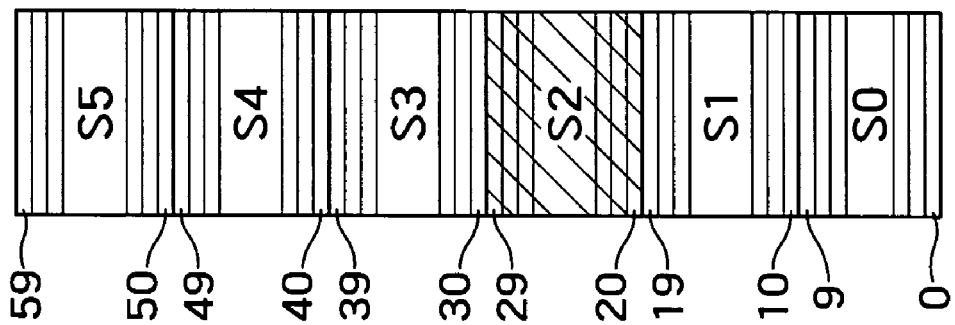
Figure 10A:
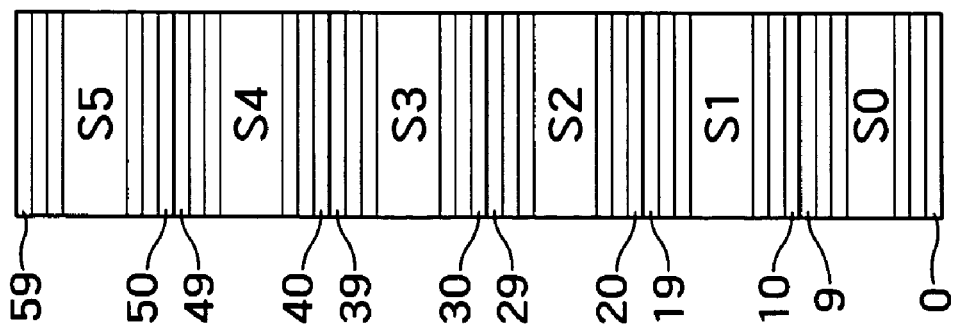

FIGS. 10A to 10C show data states within the memory 5 at time series.

As shown in FIG. 10A, no data is initially stored in the memory 5.

In this state, when the first IP circuit C(1) starts operating, as shown in FIG. 7, the address ADR1 (one of addresses 0 to 9) outputted from the first IP circuit C(1) is divided into the upper address UADR "0" and the lower address LADR "one of 0 to 9". The upper address UADR "0" is inputted to the first section determination unit 23(1), and the lower address LADR "one of 0 to 9" is inputted to the concatenate circuit 24(1).

The decoder 25 (see FIG. 8) in the first section determination unit 23(1) selects, for example, the section address SADR[2](=2) based on the upper address UADR "0".

The selected section address SADR[2] (=2) is inputted to the concatenate circuit 24(1).

The concatenate circuit 24(1) concatenates the inputted section address SADR[2](=2) with the lower address LADR "one of 0 to 9", and generates the memory address MADR1 "one of 20 to 29".

The memory 5 receives this memory address MADR1 (one of addresses 20 to 29) through the first port P1, and writes the write-in data, not shown, from the first IP circuit C(1) to an area at the memory address MADR1 (one of addresses 20 to 29) as indicated by a slant-line portion (section S2) shown in FIG. 10B.

In this state, the second IP circuit C(2) then starts operating. The address ADR2 (one of addresses 0 to 39) outputted from the second IP circuit C(2) is divided into the upper address UADR "one of 0 to 3" and the lower address LADR "one of 0 to 9". The upper address UADR "one of 0 to 3" is inputted to the second section determination unit 23(2), and the lower address LADR "one of 0 to 9" is inputted to the concatenate circuit 24(2).

The decoder 25 (see FIG. 8) in the second section determination unit 23(2) determines that the section address SADR[2](=2) is already in use, and selects, for example, one of the section addresses SADR[0], SADR[1], SADR[3], and SADR[4] for the upper address UADR "one of 0 to 3".

Namely, when the upper address UADR is "0", the section address SADR[0](=0) is selected. When the upper address UADR is "1", the section address SADR[1](=1) is selected. When the upper address UADR is "2", the section address SADR[3](=3) is selected. When the upper address UADR is "3", the section address SADR[4](=4) is selected.

The selected section address SADR[n] (where n=0, 1, 3, 4) is inputted to the concatenate circuit 24(2).

The concatenate circuit 24(2) concatenates the section address SADR[n] (=0, 1, 3, 4) with the lower address LADR "one of 0 to 9", and generates the memory address MADR2 "one of 0 to 19 and 30 to 49".

The memory 5 receives this memory address MADR2 through the second port P2, and writes the write-in data, not shown, from the second IP circuit C(2) to an area at the memory address MADR2 (one of addresses 0 to 19 and 30 to 49) as indicated by slant-line portions (sections S0, S1, S3, and S4) shown in FIG. 10C.

As described above, according to the fourth embodiment of the present invention, the memory is divided into a plurality of sections and addressees are allocated in units of sections. Therefore, each circuit does not necessarily use a continuous area, whereby it is possible to further make effective use of the memory.

The invention claimed is:

1. A semiconductor system comprising:

a shared memory;

first to n-th processing units each of which designates a memory size to use and an address to access; and first to n-th address circuits corresponding to the first to n-th processing units; wherein the first address circuit provides a value obtained by adding a memory size designated by the first processing unit to a base address given in advance for the second address circuit as a base address of the second processing circuit, the k-th (k=2 to n−1) address circuit provides a value obtained by adding a memory size designated by the k-th processing unit to a base address provided from the (k−1)-th address circuit for the (k+1)-th address circuit as a base address of the (k+1)-th processing circuit, the first address circuit generates a memory address to access in the shared memory by adding the base address given in advance to an address designated by the first processing unit, and the second to n-th address circuits generate a memory address to access in the shared memory by adding the base address provided from the first to (n−1)-th address circuits to an address designated by the second to n-th processing units.

2. The system according to claim 1, further comprising:

first to n-th memory size storages which store memory sizes to be used by the first to n-th processing unit, and wherein the first to n-th processing unit output the memory sizes stored in the first to n-th memory size storage to the first to n-th address circuits to designate the memory sizes.

3. The system according to claim 2, wherein the shared memory, the first to n-th processing units, the first to n-th address circuits, and the first to n-th memory size storages are formed on a same chip.

4. The system according to claim 3, further comprising:

a main bus connected to the chip; and a processor connected to the main bus, which sets the memory sizes for the first to n-th memory size storages.

5. The system according to claim 1, wherein each of first to n-th processing units designates the number of addresses as the memory size.

6. The system according to claim 1, wherein one or more processing units and less than n processing units operates simultaneously among the first to n-th processing units, and processing units which do not operate among the first to n-th processing units designate zero as the memory sizes.

7. The system according to claim 1, wherein the shared memory, the first to n-th processing units, the first to n-th address circuits are formed on a same chip.

* * * * *